(12) United States Patent
Cobb et al.

(10) Patent No.: US 12,305,981 B2
(45) Date of Patent: May 20, 2025

(54) LOW-COHERENCE INTERFEROMETER WITH SURFACE POWER COMPENSATION

(71) Applicant: CORNING INCORPORATED, Corning, NY (US)

(72) Inventors: Joshua Monroe Cobb, Victor, NY (US); Steven James Van Kerkhove, Webster, NY (US)

(73) Assignee: CORNING INCORPORATED, Corning, NY (US)

( * ) Notice: Subject to any disclaimer, the term of this patent is extended or adjusted under 35 U.S.C. 154(b) by 247 days.

(21) Appl. No.: 17/981,674

(22) Filed: Nov. 7, 2022

(65) Prior Publication Data

US 2023/0160686 A1    May 25, 2023

Related U.S. Application Data

(60) Provisional application No. 63/282,946, filed on Nov. 24, 2021.

(51) Int. Cl.
  *G01B 9/0209*  (2022.01)
  *G01B 9/02*    (2022.01)
  (Continued)

(52) U.S. Cl.
  CPC ....... *G01B 9/0209* (2013.01); *G01B 9/02041* (2013.01); *G01B 11/2441* (2013.01); *G01B 11/30* (2013.01); *G02B 27/1006* (2013.01)

(58) Field of Classification Search
  CPC ............... G01B 11/2441; G01B 11/30; G01B 9/02041; G01B 9/0209; G01B 9/02039; G01B 9/02065; G02B 27/1006; G02B 5/3025; G02B 5/3083; E02D 17/04; E02D 17/08; E02D 2250/0046; E02D 2600/20; E02D 2600/40; E02D 5/04; H10K 50/84; H10K 50/8445; H10K 50/868; H10K 59/00

See application file for complete search history.

(56) References Cited

U.S. PATENT DOCUMENTS 4,872,755 A  10/1989 Kuchel
6,992,779 B2  1/2006 Nobuaki
(Continued)

OTHER PUBLICATIONS

International Search Report and Written Opinion of the International Searching Authority; PCT/US2022/050404; dated Mar. 24, 2023; 18 pages; European Patent Office.

*Primary Examiner* — Tri T Ton

(57) ABSTRACT

A low-coherence Fizeau interferometer includes a first beamsplitter, a test arm and a reference arm, the first beamsplitter splits light into a first portion of light directed to the test arm and a second portion of light directed to the reference arm, and an imaging arm comprising a first collimating lens, a flat reference surface, and a test element. The test arm focuses the first portion of light at a first focal point, such that a virtual image of the first focal point appears at a focal point of the test element. The reference arm focuses the second portion of light at a second focal point, the first collimating lens collimates the light that then reflects off the flat reference surface. The second beamsplitter directs the first portion of light to reflect off the test element. The reflection of the first and second portion of light form an interference pattern.

20 Claims, 7 Drawing Sheets

(51) Int. Cl.
  *G01B 11/24*   (2006.01)
  *G01B 11/30*   (2006.01)
  *G02B 27/10*   (2006.01)

(56) References Cited

U.S. PATENT DOCUMENTS

| | | |
|---|---|---|
| 7,466,427 B2 | 12/2008 | Nokuaki |
| 2005/0046864 A1* | 3/2005 | Millerd .............. G01B 9/02003 356/495 |
| 2007/0211256 A1 | 9/2007 | Medower et al. |
| 2008/0062428 A1 | 3/2008 | Millerd et al. |
| 2011/0043661 A1* | 2/2011 | Podoleanu ........... G01B 9/0203 348/370 |

* cited by examiner

LOW-COHERENCE INTERFEROMETER WITH SURFACE POWER COMPENSATION

This Application claims the benefit of priority to U.S. Provisional Patent Application Ser. No. 63/282,946 filed on Nov. 24, 2021, the content of which is relied upon and incorporated herein by reference in its entirety.

TECHNICAL FIELD

The present disclosure generally relates to low-coherence interferometry, and more specifically to systems, methods, and apparatuses for low-coherence interferometry measurements of bowed or curved test elements.

BACKGROUND

Interferometry is a measurement method that uses the interference of waves, such as light, radio, or sound waves. In optical interferometry, for example, configured as a Fizeau interferometer, a light source is directed through a beamsplitter where a portion of the light is collimated by a lens. The collimated light then passes through a reference surface, which may also be referred to as a Fizeau surface, and reflects off a test element. The light that reflects off of the Fizeau surface and the test element then passes through a beamsplitter and is imaged by a camera system.

Interferometers are designed to measure the surfaces of flat substrates. However, in the semiconductor industry, where lithographic processes are commonly used in the semiconductor industry to convert wafers into functional microchips the repeated processing can cause an initially flat, thin substrate to bow. One source of bowing of the flat, thin substrate (e.g., wafer) is a result of film stress from the selective deposition and etching from layer to layer during lithographic processing. This stress naturally results in strain and strain variation locally on the patterned surface that varies from layer to layer. This strain can be considered to be effectively a pattern shift from layer to layer, resulting in subtle overlay errors. Historically the magnitude of these overlay errors were negligible, but with the ever shrinking pattern features (e.g., now on the order of single digit nanometers), any variability in the placement has a significant impact on the total process yield. This means there is a need to characterize the intra-die strain distribution from layer to layer to prevent process yield impacts.

Accordingly, a need exists to measure the local variation in the strain field by evaluating the change in local curvature across the wafer from process step to process step and do so quickly, as this information can be fed back into the process to improve yield.

SUMMARY

In a first aspect A1, a low-coherence Fizeau interferometer includes a low-coherence light source optically coupled to a first beamsplitter, a test arm and a reference arm optically coupled to the first beamsplitter, the first beamsplitter configured to receive light emitted from the low-coherence light source and split the received light into a first portion of light directed to the test arm and a second portion of light directed to the reference arm, and an imaging arm comprising a first collimating lens, a flat reference surface, and a test element, the imaging arm optically coupled to the first beamsplitter through a second beam splitter. The test arm comprises a selectively movable optical element configured to focus the first portion of light at a first focal point, along an optical propagation path between the first beamsplitter and a second beamsplitter optically coupling the first beamsplitter to the imaging arm, such that a virtual image of the first focal point appears at a focal point of the test element in the imaging arm. The reference arm is configured to focus the second portion of light at a second focal point along the optical propagation path so that the second portion of light directed by the second beam splitter is collimated by the first collimating lens and reflects off the flat reference surface. The second beamsplitter is configured to direct the first portion of light diverging from the first focal point through the flat reference surface to reflect off the test element. The reflection of the first portion of light and the second portion of light interfere forming an interference pattern.

In a second aspect A2 according to the first aspect A1, a camera is optically coupled to the second beamsplitter to capture the interference pattern.

In a third aspect A3 according to any preceding aspect, the test arm comprises one or more optical elements adjustably positionable at a first distance from the first beamsplitter such that the first portion of light reflected by the one or more optical elements focuses at the first focal point.

In a fourth aspect A4 according to any preceding aspect, the one or more optical elements include a third collimating lens and a reflecting element.

In a fifth aspect A5 according to any preceding aspect, wherein the first distance defines the spacing from the first beamsplitter to the third collimating lens.

In a sixth aspect A6 according to any preceding aspect, the one or more optical elements include a spherical reflecting mirror.

In a seventh aspect A7 according to any preceding aspect, the reference arm comprises a second collimating lens optically coupled to a flat mirror adjustably positionable at a second distance from the second collimating lens, the flat mirror configured to reflect the second portion of the light collimated by the second collimating lens back towards the first beamsplitter and further focusing at the second focal point along the optical propagation path.

In an eighth aspect A8 according to any preceding aspect, the low-coherence light source is a broad spectrum source comprising a wavelength range spanning +/−50 nanometers or less.

In a ninth aspect A9 according to any preceding aspect, the test element is a concave curved test element.

In a tenth aspect A10 according to any preceding aspect, wherein the test element is a convex curved test element.

In an eleventh aspect A11 according to any preceding aspect, the first beamsplitter is at least one of a cube beamsplitter, a plate beamsplitter or a pellicle beamsplitter.

In an twelfth aspect A12, a method of measuring a curved test element with a low-coherence Fizeau interferometer including a light source, a first beamsplitter configured to split light emitted from the light source a first portion of light directed toward a test arm and a second portion of light directed toward a reference arm, the test arm comprising one or more optical elements adjustably positionable at a first distance from the first beamsplitter, the reference arm comprising a first collimating lens optically coupled to a flat mirror adjustably positionable at a second distance from the first collimating lens, and a second beamsplitter configured to direct the first portion of light focused by the test arm through a flat reference surface to reflect off the curved test element and direct the second portion of light focused by the reference arm through a second collimating lens to reflect off the flat reference surface is disclosed. The method includes adjusting the first distance of the one or more optical elements of the test arm to focus the first portion of light at a first focal point, along an optical propagation path between the first beamsplitter and the second beamsplitter, such that a virtual image of the first focal point appears at a focal point of the curved test element and adjusting the second distance of the flat mirror with respect to the first collimating lens such that the optical path lengths between the test arm and the reference arm match so that a reflection of the first portion of light off the curved test element and a reflection of the second portion of light off the flat reference surface are coherent and interference occurs between the reflections, thereby forming an interference pattern.

In a thirteenth aspect A13 according to the twelfth aspect A12, the method further includes capturing the interference pattern with a camera.

In a fourteenth aspect A14 according to any preceding aspect, the method further includes analyzing the captured interference pattern to determine additional adjustments to the test arm or the reference.

In a fifteenth aspect A15 according to any preceding aspect, the one or more optical elements include a third collimating lens and a reflecting element.

In a sixteenth aspect A16 according to any preceding aspect, the first distance defines the spacing from the first beamsplitter to the third collimating lens.

In a seventeenth aspect A17 according to any preceding aspect, the one or more optical elements include a spherical reflecting mirror.

In a eighteenth aspect A18 according to any preceding aspect, the light source is a low-coherence light source having a broad spectrum comprising a wavelength range spanning +/−50 nanometers or less.

In a nineteenth aspect A19 according to any preceding aspect, the curved test element is a concave curved test element.

In a twentieth aspect A20 according to any preceding aspect, the curved test element is a convex curved test element.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
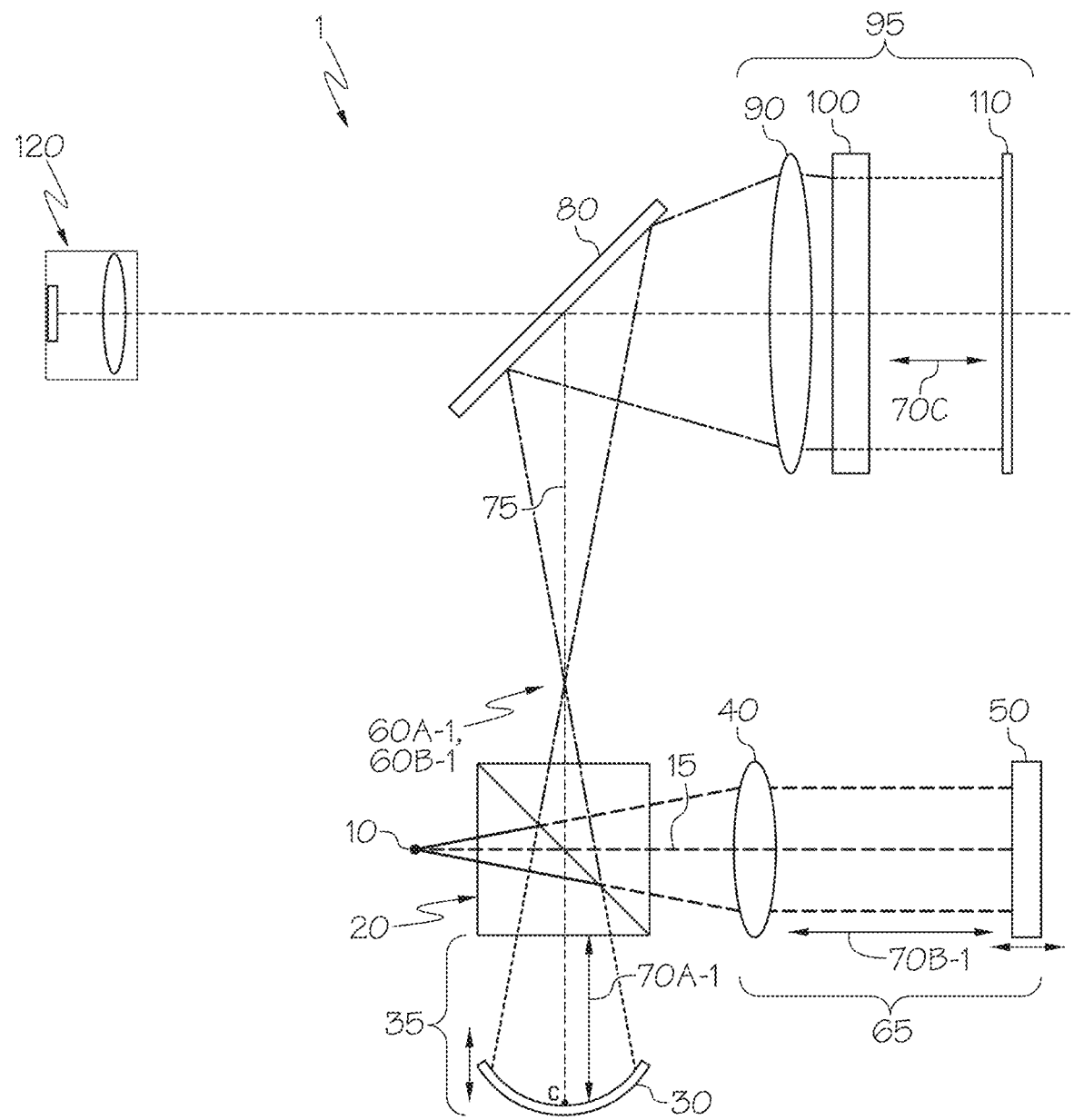
FIG. 1 depicts an illustrative schematic of a low-coherence Fizeau interferometer, according to one or more embodiments shown and described herein.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those skilled in the art will recognize that many modifications and adaptations are possible and can even be desirable in certain circumstances and are a part of the present disclosure. Therefore, it is to be understood that this disclosure is not limited to the specific articles, devices, systems, and methods disclosed unless otherwise specified. It is also to be understood that the terminology used herein is for the purposes of describing particular aspects only and is not intended to be limiting.

Embodiments described herein are directed to providing a low-coherence interferometry measurement device, system, and method that enables interferometry measurements of a curved test element using a flat Fizeau surface, which also referred to herein as a flat reference surface. For example, as a work piece, such as an initially flat, thin silicon wafer, is processed into a functional microchip, the silicon wafer can begin to bow as a result of the processing steps. Currently, silicon wafers are about 775 microns thick and have a diameter of about 300 mm. As a general rule of thumb a thin substrate is defined by an aspect ratio of 10:1 or greater. While an aspect ratio of 10:1 would indicate a minimum validity of the method for a 7.75 mm diameter area, the technique continues to have value below this limit. That is, there is interest in measuring the local variation in the strain field by evaluating the change in local curvature across the wafer from process step to process step, as this information can be fed back into the process to improve yield.

For example and without limitation, in the semiconductor industry, where lithographic processes are commonly used in the semiconductor industry to convert wafers into functional microchips the repeated processing can cause an initially flat, thin wafer substrates to bow. A commonly used process is the lithographic process which may be combined with various other process including film deposition, etch, and further patterning with lithography. In the lithography processing a wafer may be clamped flat on either a vacuum chuck or electrostatic chuck to keep the pattern surface within the depth of focus range of the lithography system. The clamping removes the surface variations caused by film stress buildup as well as the inherent flatness error of the wafer. However, subsequent processing steps such as material deposition, etching, heating, lithography and other steps, which may be repeated dozens of times, results in a change in the inherent film stack stress, and since the films are selectively etched, the distribution of this stress is non-uniform throughout the wafer and within the chip being fabricated on the wafer. This stress naturally results in strain and strain variation locally on the patterned surface that varies from layer to layer. A uniform film stress on thin substrates is known to create a pure radius of curvature change. This strain can be considered to be effectively a pattern shift from layer to layer, resulting in subtle overlay errors. Historically, the magnitude of these overlay errors were negligible, but with the ever shrinking pattern features, which are now on the order of single digit nanometers, any variability in the material deposition, etching, or lithography steps has a significant impact on the total process yield.

Accordingly, there is a need to characterize the intra-die strain distribution from layer to layer to prevent process yield impacts. However, direct measurement of the pattern placement is extremely challenging as this must be done under extremely high resolution scans. It is therefore desirable to characterize this variation in strain distribution at a global level and do so quickly.

Industry methods for characterizing wafers during fabrication into microchips utilize interferometers. For example, a Fizeau interferometer utilizing a flat Fizeau surface that corresponds to the initially flat, thin wafer may be used. However, film stress ranges on thin wafers causes the nominal radius of curvature vary substantially from a concave bow to a convex bow. The center point height with respect to the edge of a 300 mm wafer can range from +/−500 microns. Unfortunately, this range of curvatures is far outside the normal capture range of a visible wavelength normal incidence interferometer, which typically operates in the range of +/−50 microns. For example, as the radius of curvature of the wafer increases a conventional Fizeau interferometer using a flat reference surface begins to generate interference fringes that are very close together which become too dense to resolve. That is, prior to the development of the embodiments described herein, there was a limit to the amount of power (or curvature) that could be measured with a flat reference because the power fringes will be too dense to resolve.

One option for measuring a curved test element, such as a curved wafer, may be to replace the flat reference surface with a reference surface that has the same curve as the curved test element. For example, the Twyman-Green interferometer can measure a surface of a curved test element by using a reference surface that has the same curve as the curved test element. However, this requires that an optical shop maintain many different test-plates so they can measure specific surfaces. Additionally, the process of determining the appropriate curved reference surface for measuring can require many man hours to setup and calibrate. However, such changes to the measuring equipment is not very practical or feasible for use during the fabrication process.

Embodiments described herein provide an interferometer device that is capable of measuring both flat and curved test elements without the need for replacing the reference surface and further provides a feasible option for use during fabrication process where measurements can be made between process steps to improve feedback controls and improve production yields.

As described in more detail herein, embodiments include a low-coherence Fizeau interferometer having a test arm and a reference arm that can adjust the power and the focus of light provided to the flat Fizeau surface and the test element. As a result, the interferometer device can measure a bowed or very slightly powered surface where the bow is adjusted out of the measurement providing the user with a power term and a figure term for the surface quality.

In general, the interferometer system uses a low-coherence source with a relatively broad spectrum, such as several nanometers to several dozen nanometers. The light is split into two portions, a first portion of light for the test arm and a second portion of light for the reference arm. These two arms have different path lengths that will be adjusted to match the path length between a Fizeau surface and a test element. Both arms return the light to a focus point which is collimated by a collimating lens. The light from the reference arm is exactly collimated by the collimating lens and reflects off the flat Fizeau surface. The light from the test arm has an adjustable focus. This creates a diverging or converging spherical wavefront by the collimating lens and is matched to the test element. Additionally, an adjustable mirror distance in the reference arm is used to match the path length between the Fizeau surface and the test element so that the interference fringes can be captured by a camera system.

The following will now describe the discretely tunable laser systems and methods of the present disclosure in more detail with reference to the drawings, where like numbers refer to like structures.

Referring to FIG. 1, an illustrative schematic of a low-coherence Fizeau interferometer 1 according to the embodiments described herein is depicted. The low-coherence Fizeau interferometer 1 depicted in FIG. 1 specifically depicts an embodiment where the test element 110 is a flat surface, such as a wafer prior to fabrication or in the initial stages of fabrication. As described in detail herein, it will be understood that the low-coherence Fizeau interferometer 1 can measure flat and curved test elements.

In particular, the low-coherence Fizeau interferometer 1 includes a light source 10. The light source 10 is a low-coherence source. The low-coherence source may have a broad spectrum. The broad spectrum refers to a wavelength range spanning a few nanometers, tens of nanometers, or several dozen nanometers. In some embodiments, the light source 10 is a low-coherence source with a broad spectrum including a wavelength range spanning +/−10 nanometers, +/−20 nanometers, +/−30 nanometers, +/−40 nanometers, or +/−50 nanometers or less.

The light source 10 generates light and emits the light along an optical path 15. A first beamsplitter 20 optically coupled to the light source 10 receives the emitted light. The first beamsplitter 20 may be a cube beamsplitter, a plate beamsplitter, a pellicle beamsplitter, or the like. The first beamsplitter 20 is an optical element configured to receive a beam of light and split the beam of light into two or more separate beams. For example, as depicted in FIG. 1, the first beamsplitter 20 splits the light emitted from the light source 10 into two channels, one channel being a first portion of light and the second channel being a second portion of light. As depicted, the first portion of light is shown in dot-dot lines, the second portion of light is shown in dash-dash lines.

Figure 7:
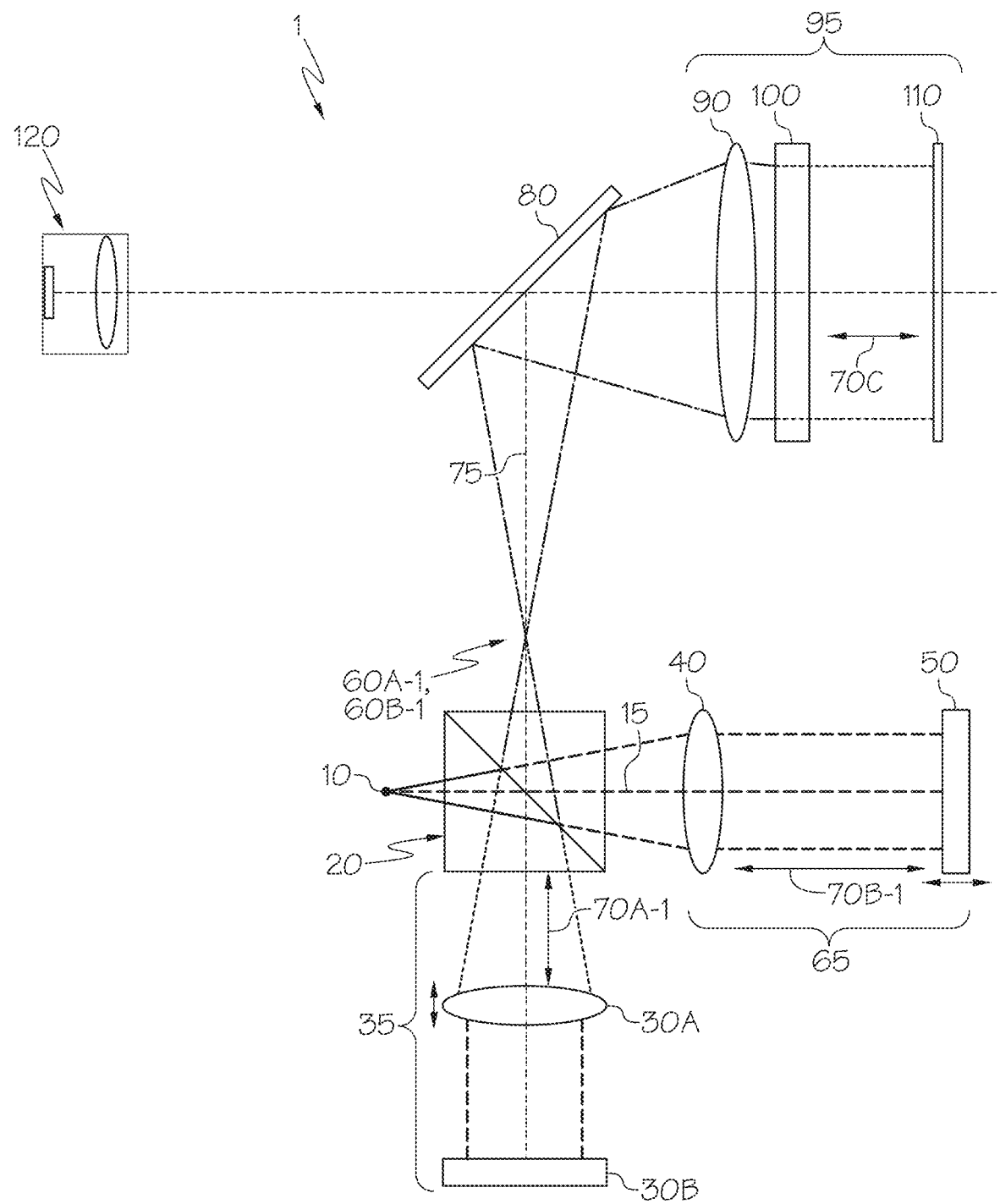
FIG. 7 depicts an illustrative schematic of a low-coherence Fizeau interferometer, according to one or more embodiments shown and described herein.

The first beamsplitter 20 directs the first portion of light toward a test arm 35 and the second portion of light toward a reference arm 65. The test arm 35 includes one or more optical elements configured to focus the first portion of light at a first focal point 60A-1. The test arm 35 is configured with one or more optical elements that enable the first focal point 60A-1 to be adjusted in location along an optical propagation path 75 defined between the first beamsplitter 20 and the second beamsplitter 80, which will be described in more detail herein. The one or more optical elements of the test arm 35 include at least one reflecting element such as a spherical reflecting mirror 30. In some embodiments, the spherical reflecting mirror 30 may be replaced with a third collimating lens 30A and a flat mirror 30B as shown in FIG. 7. For a flat test element 110, as depicted in FIG. 1, the spherical reflecting mirror 30 is positioned a first distance 70A-1 from the first beamsplitter 20 so that the first portion of light is reflected and focused at focal point 60A-1. The distance from the spherical reflecting mirror 30 to the first focal point 60A-1 is approximately the radius of curvature of the spherical reflecting mirror 30. Additionally, the light source 10 is positioned so that the light emitted, once split by the first beamsplitter 20, lies approximately at the center C of curvature of the spherical reflecting mirror 30.

Figure 3:
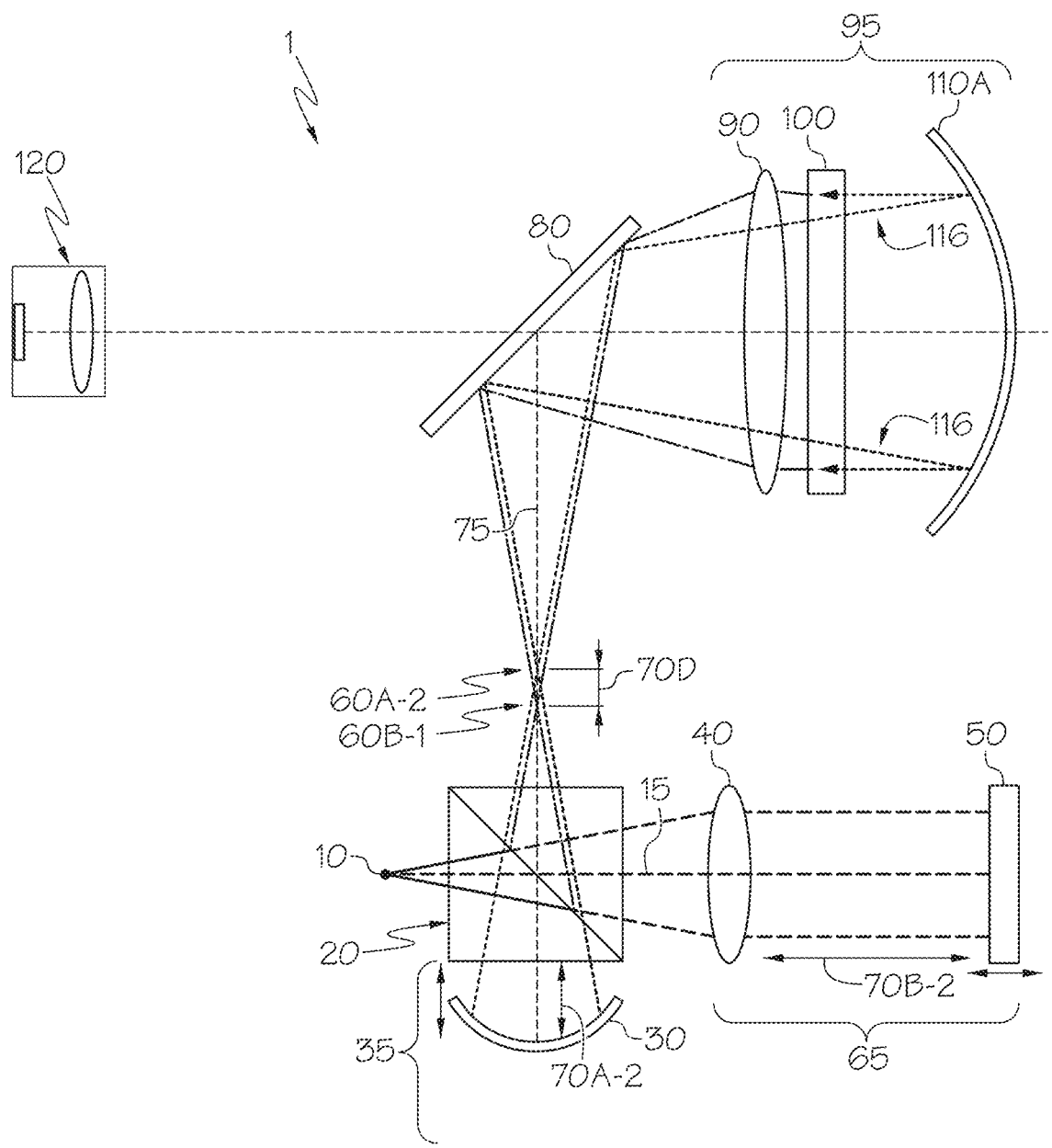
FIG. 3 depicts an illustrative schematic of a low-coherence Fizeau interferometer with a test arm adjustment for measuring a concave curved test element, according to one or more embodiments shown and described herein.
Figure 4:
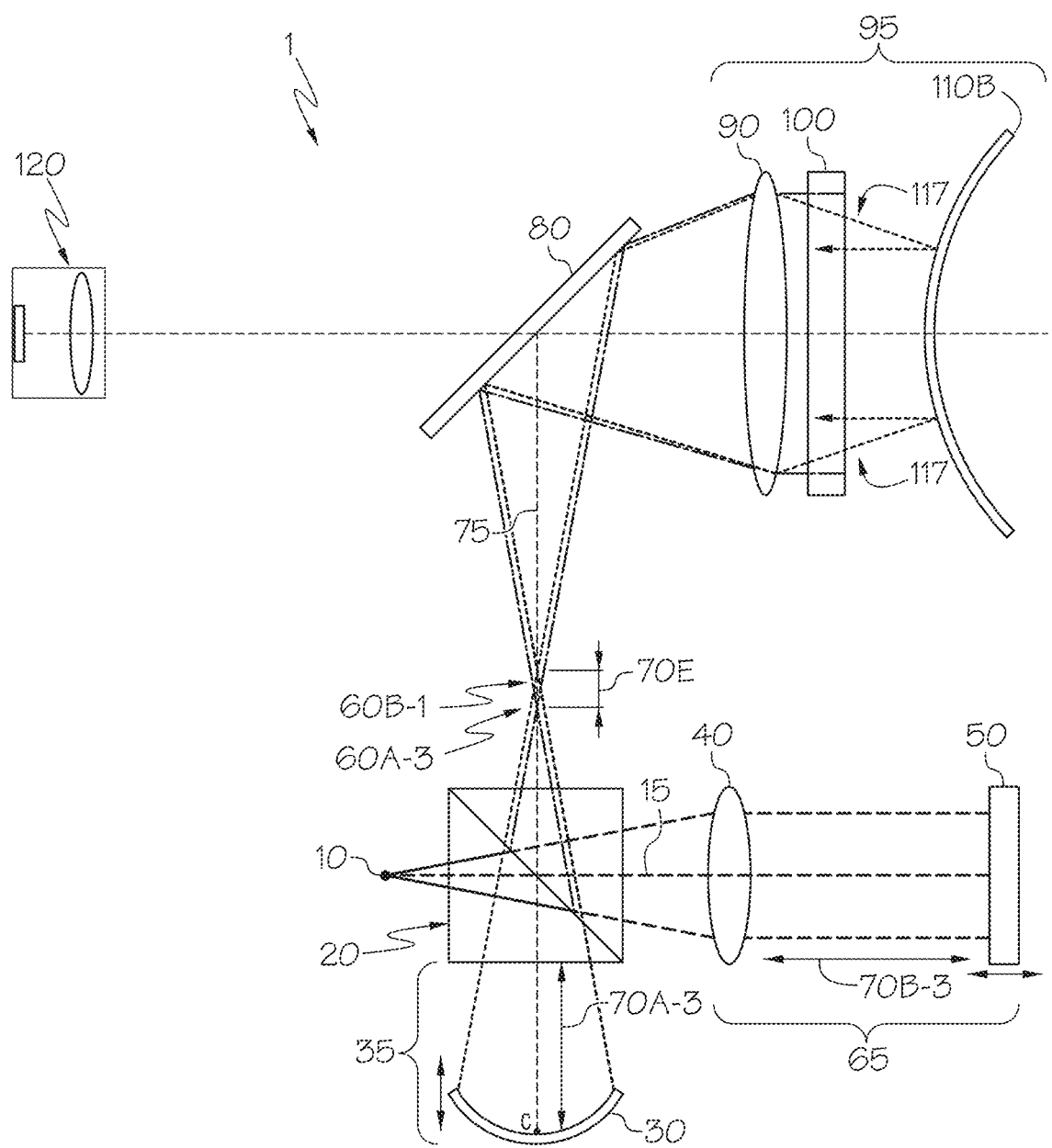
FIG. 4 depicts an illustrative schematic of a low-coherence Fizeau interferometer with a test arm adjustment for measuring a convex curved test element, according to one or more embodiments shown and described herein.

The spherical reflecting mirror 30 and/or the other one or more optical elements of the test arm 35 may be adjustably positionable such that the beam path length of the test arm 35 can be tuned and the location of the first focal point 60A-1 along an optical propagation path 75 can be adjusted to accommodate test elements 110 that are flat, have a bow that is convex or a bow that is concave, as described in more detail herein with respect to FIGS. 3 and 4. In embodiments, where a third collimating lens 30A and a flat mirror 30B are implemented in the test arm 35 in place of the spherical reflecting mirror 30, the position and distance of the third collimating lens 30A from the first beamsplitter 20 may be adjusted to focus the first portion of light at the first focal point 60A-1. The adjustments in position of the one or more optical elements of the test arm 35 may be facilitated by actuating means such as a stepper motor driven actuator, piezoelectric devices, or other coarse and/or fine tuning mechanical or electromechanical mechanisms.

Still referring to FIG. 1, the second portion of light split from the light emitted from the light source 10 is directed toward the reference arm 65. Since adjustments in the test arm 35 may change the optical path length of the first portion of light through the interferometer 1, the reference arm 65 is configured to be adjustable such that the optical path length of the second portion of light through the interferometer 1 matches so that interference can occur between the light reflected from the test element 110 and the light reflected from the flat reference surface 100. The flat reference surface 100 may be a planar lens element configured to have a flat surface which reflects light. The reference arm 65 includes a plurality of optical elements. For example, the reference arm 65 is configured to receive the second portion of light from the first beamsplitter 20. The second portion of light is collimated by a first collimating lens 40 and then reflected by a mirror 50 (e.g., a flat mirror). The collimated and reflected light of the second portion of light traverses a distance 70B-1 between the first collimating lens 40 and the mirror 50. The reflected light of the second portion of light is focused by the first collimating lens 40 and directed by the first beamsplitter 20 to a second focal point 60B-1 along the optical propagation path 75. The distance 70B-1 may be adjusted by changing the position of the mirror 50 with respect to the first collimating lens 40. The adjustments in position of the one or more optical elements of the test arm 35 may be facilitated by actuating means such as a stepper motor driven actuator, piezoelectric devices, or other coarse and/or fine tuning mechanical or electromechanical mechanisms.

For a test element 110 which is flat, for example, having a curvature with a maximum radius of about 50 microns or less, the focal points 60A-1 and 60B-1 may be at the same location along the optical propagation path 75. This common location is the focal point of the second collimating lens 90 so that the first portion of light and the second portion of light may be collimated by the second collimating lens 90.

Referring to the first portion of light from the test arm 35, as the light diverges from the first focal point 60A-1, a second beamsplitter 80 splits the light and directs the light into the imaging arm 95 of the interferometer 1. The light is then collimated by the second collimating lens 90. The collimated first portion of light then passes through the flat reference surface 100 and reflects off the test element 110. The light that reflects off of the flat reference surface 100 and test element 110 then passes through the second beamsplitter 80 and is imaged by a camera system 120. The camera system 120 may include an image capture device and one or more optical elements.

Referring to the second portion of light from the reference arm 65, as the light diverges from the second focal point 60B-1, the second beamsplitter 80 splits the light and directs the light into the imaging arm 95 of the interferometer 1. The second collimating lens 90 collimates the second portion of light which is an image of the light source 10. The collimated light is reflected off of the flat reference surface 100 while the light from the test arm 35 is reflected off of the test element 110. It is important to note that no interference occurs between these two beams of light because the distance 70C between the flat reference surface 100 and the test element 110 is longer than a coherence length of the light source 10.

The two reflections of light from the imaging arm 95 interfere with each other to form an interference patter that can be viewed by the camera system 120. As noted herein, the distance 70B-1 between the first collimating lens 40 and the mirror 50 is adjusted so that the two reflections are coherent with each other and the interference pattern can be viewed on the camera system 120. It is noted that, there may be additional reflections of light which end up on the camera system 120, but these do not interfere with each other due to the path difference being longer than the coherence length of the light source 10.

Figure 2:
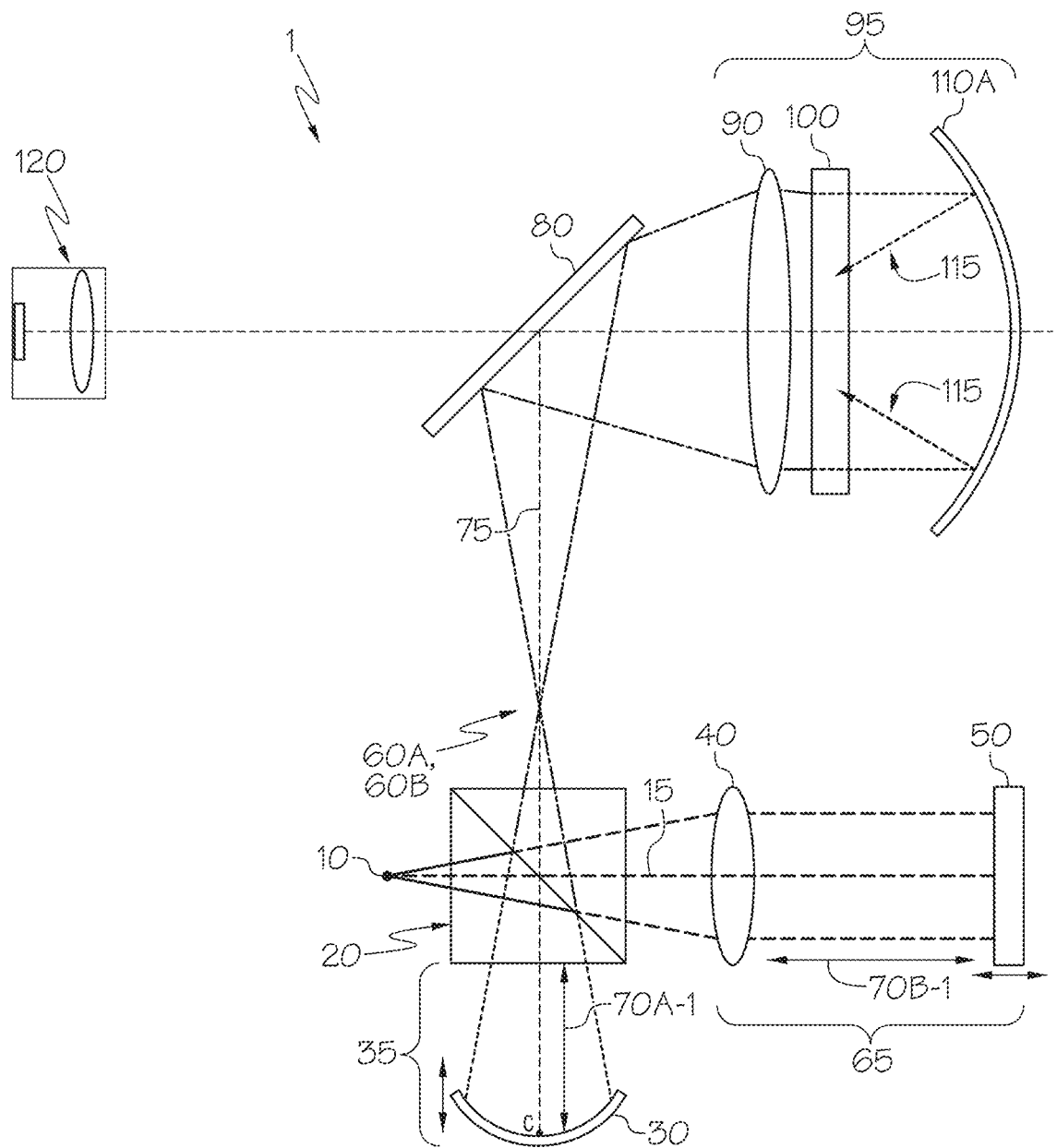
FIG. 2 depicts an illustrative schematic of a low-coherence Fizeau interferometer without a test arm adjustment for measuring a curved test element, according to one or more embodiments shown and described herein.

Referring now to FIG. 2, an illustrative schematic of the low-coherence Fizeau interferometer 1 according to the embodiments described herein is depicted. However, unlike the low-coherence Fizeau interferometer 1 system depicted in FIG. 1, FIG. 2 depicts a situation where the test element 110 is a concave curved test element 110A. Additionally, the test arm 35 and the reference arm 65 have not been adjusted for the concave curved test element 110A from the previous flat test element 110 depicted in FIG. 1. Accordingly, FIG. 2 provides an illustrative example of the issue that arises from attempting to measure a curved test element using optical positions for a flat test element. It is noted that the curvature of the test element and the illustrated light propagation paths are exaggerated for clarity.

As a test element changes from flat to curved the focal point of the test element changes. When the first portion of light which has a first focal point 60A-1 is collimated by the second collimating lens 90, the reflection of light from the concave curved test element 110A is a spherical converging beam 115. However, the second portion of light from the reference arm 65 that is reflected off the flat reference surface 100 is a flat beam 105. When the spherical converging beam 115 interferes with the flat beam 105 power fringes are generated that cannot be resolved. Moreover, the camera system 120 would need to be adjusted to operate at a very high numerical aperture in order to transmit the high angle of light. However, as discussed herein with reference to FIGS. 3 and 4, by adjusting the location of the first focal point of the first portion of light focused by the test arm 35 a diverging or converging spherical wavefront created by the second collimating lens 90 is matched to the concave curved test element 110A. Although FIG. 2 depicts a concave curved test element 110A, it is understood that the concave curved test element 110A may also be a convex curved test element.

Referring now to FIG. 3, an illustrative schematic of the low-coherence Fizeau interferometer 1 according to the embodiments described herein is depicted where the test arm 35 and the reference arm 65 are adjusted to measure the concave curved test element 110A. Referring to the test arm 35, the spherical reflecting mirror 30 is adjusted to a distance 70A-2 from the first beamsplitter 20. The change in distance of the spherical reflecting mirror 30 with respect to the first beamsplitter 20 changes the position of the focal point of the first portion of light along the optical propagation path 75. The goal is to adjust the position of the spherical reflecting mirror 30 so that the virtual image of a new focal point 60A-2 appears at the focal point of the concave curved test element 110A. In some embodiments, adjusting the spherical reflecting mirror 30 includes moving the position of the spherical reflecting mirror 30 closer or farther from the first beamsplitter 20. In embodiments where a third collimating lens 30A and a mirror 30B are implemented instead of the spherical reflecting mirror 30 in the test arm 35, the distance that the third collimating lens 30A is positioned from the first beamsplitter 20 defines the position of the new first focal point 60A-2 along the optical propagation path 75.

The adjustment of the spherical reflecting mirror 30 shifts the position of first focal point from 60A-1 as shown in FIG. 1 to a first focal point depicted at 60A-2 as shown in FIG. 3. As the light diverges from the new first focal point 60A-2 and is directed into the imaging arm 95, the second collimating lens 90 may not collimate the light. The light exits the second collimating lens 90 in a diverging fashion such that the virtual image of the new focal point 60A-2 appears at the focal point of the concave curved test element 110A. The diverging first portion of light 116 reflects off of the concave curved test element 110A and is capable of interfering with the second portion of light from the reference arm 65. In order to interfere with the second portion of light from the reference arm 65, adjustments to the distance 70B-1 defined in the reference arm 65 may be required to match the optical path lengths between the two arms of the interferometer 1 so that interference can occur between the reflected light off of the concave curved test element 110A and the reflected light off of the flat reference surface 100. For example, the distance 70B-1 may be increased or decreased by adjusting the position of the mirror 50 with respect to the first collimating lens 40. The first collimating lens 40 may not be repositioned since doing so would change the position of the second focal point 60B-1.

As depicted in FIG. 3, the new first focal point 60A-2 of the first portion of light from the test arm 35 is closer to the second beamsplitter 80 than the second focal point 60B-1 of the second portion of light from the reference arm 65 along the optical propagation path 75. The distance 70D between the new first focal point 60A-2 and the second focal point 60B-1 is a direct measurement of the power in the concave curved test element 110A. Accordingly, the power in the concave curved test element 110A can be determined based on the change in the position of the spherical reflecting mirror 30 from measuring a flat test element 110 to measuring the concave curved test element 110A.

Turning now to FIG. 4, an illustrative schematic of the low-coherence Fizeau interferometer 1 according to the embodiments described herein is depicted where the test arm 35 and the reference arm 65 are adjusted to measure a convex curved test element 110B. Referring to the test arm 35, the spherical reflecting mirror 30 is adjusted to a distance 70A-3 from the first beamsplitter 20. The change in distance of the spherical reflecting mirror 30 with respect to the first beamsplitter 20 changes the position of the focal point of the first portion of light along the optical propagation path 75. The goal is to adjust the position of the spherical reflecting mirror 30 so that the virtual image of a new focal point 60A-3 appears at the focal point of the convex curved test element 110B. In some embodiments, adjusting the spherical reflecting mirror 30 includes moving the position of the spherical reflecting mirror 30 closer or farther from the first beamsplitter 20. In embodiments where a collimating lens 30A and a mirror 30B are implemented instead of the spherical reflecting mirror 30 in the test arm 35, the distance that the third collimating lens 30A is positioned from the first beamsplitter 20 defines the position of the new first focal point 60A-3 along the optical propagation path 75.

The adjustment of the spherical reflecting mirror 30 shifts the position of first focal point from 60A-1 as shown in FIG. 1 to a new first focal point depicted at 60A-3 as shown in FIG. 4. As the light diverges from the new first focal point 60A-3 and is directed into the imaging arm 95, where the light that exits the second collimating lens 90 in a converging fashion such that the virtual image of the new focal point 60A-3 appears at the focal point of the convex curved test element 110B. The converging first portion of light 117 reflects off of the convex curved test element 110B and is capable of interfering with the second portion of light from the reference arm 65. In order to interfere with the second portion of light from the reference arm 65, adjustments to the distance 70B-1 defined in the reference arm 65 may be required to match the optical path lengths between the two arms of the interferometer 1 so that interference can occur between the reflected light off of the convex curved test element 110B and the reflected light off of the flat reference surface 100. For example, the distance 70B-1 may be increased or decreased by adjusting the position of the mirror 50 with respect to the first collimating lens 40. The first collimating lens 40 may not be repositioned since doing so would change the position of the second focal point 60B-1.

As depicted in FIG. 4, the new first focal point 60A-3 of the first portion of light from the test arm 35 is farther to the second beamsplitter 80 than the second focal point 60B-1 of the second portion of light from the reference arm 65 along the optical propagation path 75. The distance 70E between the new first focal point 60A-3 and the second focal point 60B-1 is a direct measurement of the power in the convex curved test element 110B. Accordingly, the power in the concave curved test element 110B can be determined based on the change in the position of the spherical reflecting mirror 30 from measuring a flat test element 110 to measuring the convex curved test element 110B.

Embodiments of the interferometer 1 described herein provide a measuring device having a test arm 35 and a reference arm 65 and an imaging arm 95. The test arm 35 includes one or more optical elements that are selectively positionable to focus a first portion of light at a first focal point such that the virtual image of the focal point appears at a focal point of a curved test element. The reference arm 65 includes optical elements configurable in position to match the optical path lengths of light propagating from the test arm 35 and the reference arm 65 so that interference occurs between reflections off of the flat reference surface 100 and the curved test element. Embodiments described herein eliminate the need to match the reference element in the imaging arm 95 with the curvature of the test element thereby providing a feasible solution for more efficient and quick measurements for applications such as process step to process step measurements during the fabrication of wafers into microchips.

Figure 5:
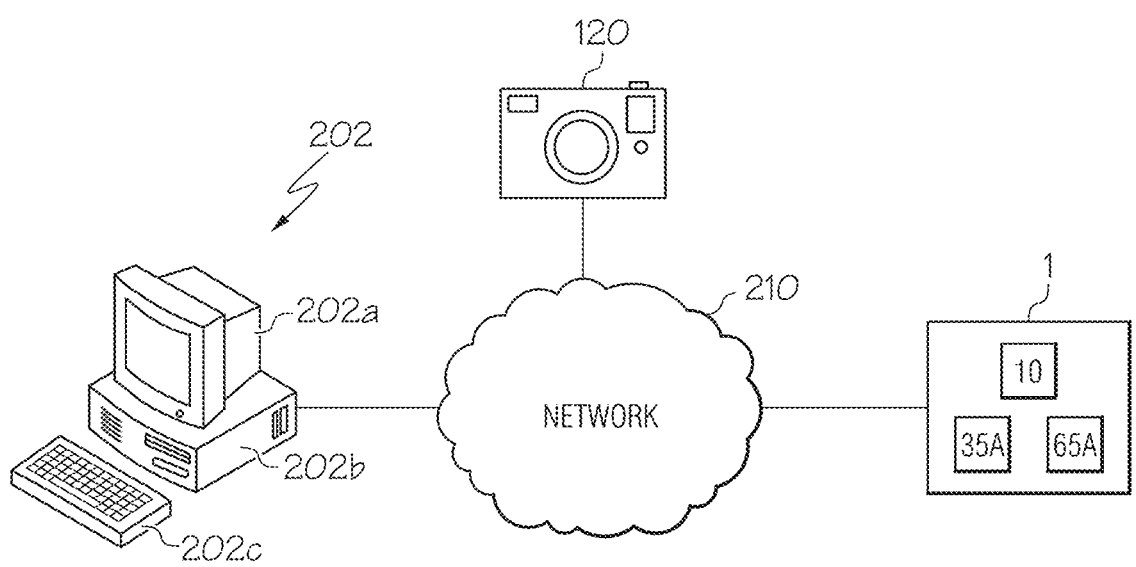
FIG. 5 depicts an illustrative block diagram of an interferometry system, according to one or more embodiments shown and described herein.

Referring now to FIG. 5, an illustrative interferometry system 2 is depicted. The system 2 includes a camera system 120, an interferometer 1, and a computing device 200. The system 2 enables a user to obtain interferometry measurements and configure the interferometer 1 to measure a test element automatically without the need to change out optical components within the interferometer 1. The computing device 200, the camera system 120, and the interferometer 1 are communicatively coupled together. Optionally the computing device 200, the camera system 120, and the interferometer 1 are communicatively coupled together via a network 210. The network 104 may include a wide area network, such as the internet, a local area network (LAN), a mobile communications network, a public service telephone network (PSTN) and/or other network.

The computing device 202 may include a display 202a, a processing unit 202b and an input device 202c, each of which may be communicatively coupled together and/or to the network 210. The computing device 202 may be used to interface with a user who may adjust and/or configure the signal generator to reduce laser coherence effects within the optical system and/or perform a finite element analysis of the optical system. It should be understood that the computing device 102 is depicted as a personal computer however, this is merely an example. More specifically, any type of computing device (e.g., mobile computing device, personal computer, server, phone, and the like) may be utilized for any of these components. Additionally, while each of these computing devices is illustrated in FIG. 5 as a single piece of hardware, this is also an example. More specifically, the computing device 202 may represent a plurality of computers, servers, databases, and the like.

The computing device 202 may be configured to receive image data from the camera system 120 and perform interferometric analysis and calculations based on the received image data. The computing device 202 may be communicatively coupled to one or more of the control mechanisms of the interferometer 1. For example, the control mechanisms of the interferometer 1 may include a test arm adjusting mechanism 35A and/or a reference arm adjusting mechanism 65A. The test arm adjusting mechanism 35A and the reference arm adjusting mechanism 65A may include a stepper motor driven actuator, piezoelectric devices, or other coarse and/or fine tuning mechanical or electromechanical mechanisms for adjusting the position of optical elements within the interferometer 1 as described herein. The computing device 202 may include preset configurations for various test elements which cause the test arm adjusting mechanism 35A and/or the reference arm adjusting mechanism 65A to automatically position the optical elements when a particular test element is selected by a user through the computing device 202. The computing device 202 may also provide manual control of the test arm adjusting mechanism 35A and/or the reference arm adjusting mechanism 65A to a user so that new configurations may be developed or existing configurations may be updated. The preset configurations may be a stored table of positioning values for positioning elements such as the spherical reflecting mirror 30 or the mirror 50. In some embodiments, the computing device 202 may also be communicatively coupled to the interferometer 1 to control the light source 10. Control of the light source 10 may include activation or deactivation of the source, an adjustment to the wavelength or frequency of light emitted, or the like.

Figure 6:
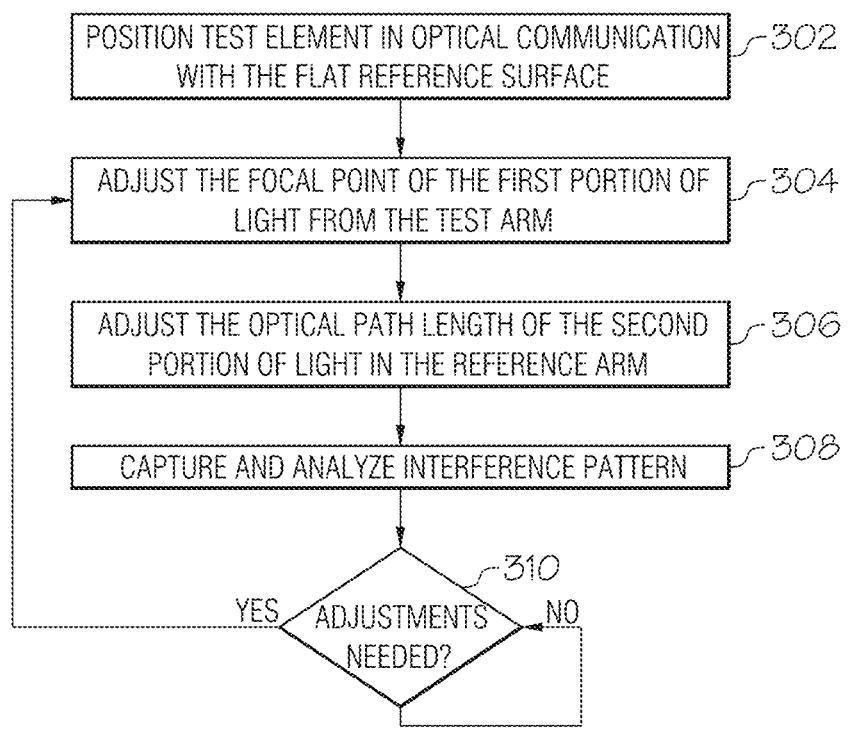
FIG. 6 depicts a flowchart of a method for configuring low-coherence Fizeau interferometer for measuring a curved test element, according to one or more embodiments shown and described herein.

Turning now to FIG. 6, a flow diagram 300 depicting an illustrative method for configuring the interferometer 1 according to embodiments described herein is depicted. The method may be programmed as a routine for execution by the computing device 202. At block 302, a test element for measuring is positioned with the interferometer 1. For example, the test element, such as a thin wafer, may be positioned in a holder vertically with reference to gravity so that gravity acts on the diameter of the wafer instead of across the large thin surface, which may contribute to additional bowing of the thin wafer. Once the test element is positioned in optical commination with the flat reference surface 100 of the interferometer 1, the test arm 35 is configured. In some embodiments, the test element 110, 110A, or 110B may be robotically installed through the manipulation of a robotic arm or other device.

At block 304, one or more optical elements may be adjusted to set the first focal point of the first portion of light at a position along the optical propagation path 75 such that the virtual image of the first portion of light at the first focal point 60A appears at the focal point of the test element 110, 110A, or 110B. Adjustments in the test arm 35 may be carried out through the computing device 202. The computing device 202 may generate and send one or more control signals to the test arm adjusting mechanism 35A thereby facilitating the repositioning of an optical element such as the spherical reflecting mirror 30 or a collimating lens.

At block 306, the optical path length of the second portion of light in the reference arm 65 is adjusted to match the optical path lengths between the test arm 35 and the reference arm 65 of the interferometer 1 so that interference between the reflections off the test element and the flat reference surface 100 can occur. Adjustments in the reference arm 65 may be carried out through the computing device 202. The computing device 202 may generate and send one or more control signals to the reference arm adjusting mechanism 65A thereby facilitating the repositioning of an optical element such as the mirror 50 and/or other optical elements of the reference arm 65.

At block 308, the camera system 120 captures and transmits image data of the interference pattern to the computing device 202. The computing device 202 may display the interference pattern on the display 202a and/or execute analysis of the interference pattern. Analysis of the interference pattern may generate various results depending on the analysis prescribed. For example, a power term and a figure term for the surface quality of the test element may be determined and provided to the user. Additionally, in some embodiments, the analysis may determine whether additional adjustments are needed to improve the interferences, adjust for dense power fringes, or the like. At block 310, a determination is made as to whether additional adjustments are needed or whether a new test element has been coupled with the interferometer 1. If adjustments are determined to be needed "YES" at block 310, the process returns to block 304. If no further adjustments are determined to be needed "NO" at block 310, the process may end or continue checking until an event triggers a determination for further adjustments.

It should now be understood that embodiments described herein are directed to providing a low-coherence interferometry measurement device, system, and method that enables interferometry measurements of a curved test element using a flat Fizeau surface, which also referred to herein as a flat reference surface. For example, the low-coherence Fizeau interferometer includes a low-coherence broad spectrum light source for emitting light along an optical path and a first beamsplitter configured to split the light emitted along the optical path into a first portion of light directed toward a test arm and a second portion of light directed toward a reference arm. The test arm includes one or more optical elements adjustably positionable at a first distance from the first beamsplitter such that the first portion of light reflected by the one or more optical elements focuses at a first focal point along an optical propagation path defined between the first beamsplitter and a second beamsplitter. The reference arm includes a first collimating lens optically coupled to a flat mirror adjustably positionable at a second distance from the first collimating lens. The flat mirror is configured to reflect the second portion of the light collimated by the first collimating lens back towards the first beamsplitter and further focusing at a second focal point along the optical propagation path.

The second beamsplitter is configured to direct the first portion of light diverging from the first focal point through a second collimating lens and a flat reference surface onto a test element, and direct the second portion of light diverging from the second focal point through the second collimating lens to the flat reference surface. The first distance alters an optical path length of the first portion of light, and the second distance alters an optical path length of the second portion of light and the second distance is set such that the optical path lengths between the test arm and the reference arm match so that a reflection of the first portion of light off the test element and a reflection of the second portion of light off the flat reference surface are coherent and interference occurs between the reflections, thereby forming an interference pattern. Additionally, a camera optically coupled to the second beamsplitter captures the interference pattern and may transmit the image data to a computing device for analysis.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A low-coherence Fizeau interferometer comprising:
   a low-coherence light source optically coupled to a first beamsplitter;
   a test arm and a reference arm optically coupled to the first beamsplitter, the first beamsplitter configured to receive light emitted from the low-coherence light source and split the received light into a first portion of light directed to the test arm and a second portion of light directed to the reference arm; and
   an imaging arm comprising a second collimating lens, a flat reference surface, and a test element, the imaging arm optically coupled to the first beamsplitter through a second beam splitter, wherein:
   the test arm comprises a selectively movable optical element configured to focus the first portion of light at a first focal point and adjust a position of the first focal point, along an optical propagation path between the first beamsplitter and the second beamsplitter optically coupling the first beamsplitter to the imaging arm,
   the reference arm is configured to focus the second portion of light at a second focal point along the optical propagation path so that the second portion of light directed by the second beam splitter is collimated by the second collimating lens and reflects off the flat reference surface,
   the second beamsplitter is configured to direct the first portion of light diverging from the first focal point through the flat reference surface to reflect off the test element, and
   the reflection of the first portion of light and the second portion of light interfere to form an interference pattern.

2. The low-coherence Fizeau interferometer of claim 1, further comprising a camera optically coupled to the second beamsplitter to capture the interference pattern.

3. The low-coherence Fizeau interferometer of claim 1, wherein the test arm comprises one or more optical elements adjustably positionable at a first distance from the first beamsplitter such that the first portion of light reflected by the one or more optical elements focuses at the first focal point.

4. The low-coherence Fizeau interferometer of claim 3, wherein the one or more optical elements include a third collimating lens and a reflecting element, and wherein the first distance defines the spacing from the first beamsplitter to the third collimating lens.

5. The low-coherence Fizeau interferometer of claim 3, wherein the one or more optical elements include a spherical reflecting mirror.

6. The low-coherence Fizeau interferometer of claim 1, wherein the reference arm comprises a first collimating lens optically coupled to a flat mirror adjustably positionable at a second distance from the first collimating lens, the flat mirror configured to reflect the second portion of light collimated by the first collimating lens back towards the first beamsplitter and further focusing at the second focal point along the optical propagation path.

7. The low-coherence Fizeau interferometer of claim 1, wherein the low-coherence light source is a broad spectrum source comprising a wavelength range spanning +/−50 nanometers or less.

8. The low-coherence Fizeau interferometer of claim 1, wherein the test element is a concave curved test element or a convex curved test element.

9. The low-coherence Fizeau interferometer of claim 1, wherein the first beamsplitter is at least one of a cube beamsplitter, a plate beamsplitter or a pellicle beamsplitter.

10. A method of measuring a curved test element with a low-coherence Fizeau interferometer comprising:
    a light source,
    a first beamsplitter configured to split light emitted from the light source into a first portion of light directed toward a test arm and a second portion of light directed toward a reference arm,
    the test arm comprising one or more optical elements adjustably positionable at a first distance from the first beamsplitter, the reference arm comprising a first collimating lens optically coupled to a flat mirror adjustably positionable at a second distance from the first collimating lens, and a second beamsplitter configured to direct the first portion of light focused by the test arm through a flat reference surface to reflect off the curved test element and direct the second portion of light focused by the reference arm through a second collimating lens to reflect off the flat reference surface, the method comprising:

adjusting the first distance of the one or more optical elements of the test arm to focus the first portion of light at a first focal point and adjust a position of the first focal point, along an optical propagation path between the first beamsplitter and the second beamsplitter, such that a virtual image of the first focal point appears at a focal point of the curved test element; and adjusting the second distance of the flat mirror with respect to the first collimating lens such that the optical path lengths between the test arm and the reference arm match so that a reflection of the first portion of light off the curved-test element and a reflection of the second portion of light off the flat reference surface are coherent and interference occurs between the reflections, thereby forming an interference pattern.

11. The method of claim 10, further comprising capturing the interference pattern with a camera.

12. The method of claim 10, further comprising analyzing the captured interference pattern to determine additional adjustments to the test arm or the reference.

13. The method of claim 10, wherein the one or more optical elements include a third collimating lens and a reflecting element, and wherein the first distance defines the spacing from the first beamsplitter to the third collimating lens.

14. The method of claim 10, wherein the one or more optical elements include a spherical reflecting mirror.

15. The method of claim 10, wherein the light source is a low-coherence light source having a broad spectrum comprising a wavelength range spanning +/−50 nanometers or less.

16. The method of claim 10, wherein the curved test element is a concave curved test element or a convex curved test element.

17. The low-coherence Fizeau interferometer of claim 6, wherein the first collimating lens is not repositionable.

18. The low-coherence Fizeau interferometer of claim 1, wherein a distance between the first focal point and the second focal point measures a test element that is curved.

19. The method of claim 10, wherein the first collimating lens is not repositionable.

20. The method of claim 10, wherein a distance between the first focal point and the second focal point measures the curved test element.

* * * * *